US012627409B2

(12) United States Patent　　　(10) Patent No.: US 12,627,409 B2
Hirvi et al.　　　　　　　　　　　(45) Date of Patent: May 12, 2026

(54) DATA PACKET TRANSACTION TIMING SOLUTION FOR A WIRELESS COMMUNICATION SYSTEM

(71) Applicant: WIREPAS OY, Tampere (FI)

(72) Inventors: Hannu Hirvi, Tampere (FI); Ville Juven, Tampere (FI)

(73) Assignee: WIREPAS OY, Tampere (FI)

( * ) Notice: Subject to any disclaimer, the term of this patent is extended or adjusted under 35 U.S.C. 154(b) by 340 days.

(21) Appl. No.: 18/269,014

(22) PCT Filed: Dec. 21, 2021

(86) PCT No.: PCT/FI2021/050904

§ 371 (c)(1),
(2) Date: Jun. 22, 2023

(87) PCT Pub. No.: WO2022/136739

PCT Pub. Date: Jun. 30, 2022

(65) Prior Publication Data

US 2024/0305410 A1　　Sep. 12, 2024

(30) Foreign Application Priority Data

Dec. 23, 2020　(FI) ..................................... 20206369

(51) Int. Cl.
*H04L 1/1607*　　(2023.01)
*H04L 5/00*　　　(2006.01)
*H04W 74/0833*　(2024.01)

(52) U.S. Cl.
CPC .......... *H04L 1/1692* (2013.01); *H04L 5/0055* (2013.01); *H04W 74/085* (2013.01)

(58) Field of Classification Search
CPC ....... H04L 1/1692; H04L 5/0055; H04L 1/16; H04L 1/1607; H04L 1/1887;
(Continued)

(56) References Cited

U.S. PATENT DOCUMENTS

2016/0337219 A1*　11/2016　Smith ........................ H04L 1/16
2018/0367286 A1*　12/2018　Guo ....................... H04L 5/0064
(Continued)

FOREIGN PATENT DOCUMENTS

JP　　2011035600 A　　2/2011
JP　　2015231229 A　　12/2015
(Continued)

OTHER PUBLICATIONS

Search Report from Finnish Application No. 20206369, dated Sep. 15, 2021, 2 pages.
(Continued)

*Primary Examiner* — Mang Hang Yeung
(74) *Attorney, Agent, or Firm* — Meunier Carlin & Curfman LLC

(57) ABSTRACT

The invention relates to a wireless communication system (100) comprising a plurality of radio devices (102, 202, 204). Each of the plurality of radio devices (102, 202, 204) is capable of transmit and receive data packets (220). At least one radio device (102, 202, 204) is configured to: ACK packets (240) received from one or more neighbouring radio devices (102, 202, 204) in response to transmitted data packets (220); determine lengths of ACK gap (230) periods of the one or more neighbouring radio devices (102, 202, 204) based on the observed ACK packets (240); and adjust its ACK listening duration (250) based on the determined lengths of the ACK gap periods (230). The invention relates also to a method for a wireless communication system (100), a radio device (102, 202, 204) for a wireless communication system (100), a method for the radio device (102, 202, 204), a computer program (505), and a tangible non-volatile computer-readable medium.

14 Claims, 2 Drawing Sheets

(58) Field of Classification Search
CPC .. H04L 1/1896; H04W 74/085; H04W 84/22;
 H04W 52/0216; H04W 74/00; H04W
 84/00
USPC ......................................................... 370/329
See application file for complete search history.

(56) References Cited

U.S. PATENT DOCUMENTS

| | | | | |
|---|---|---|---|---|
| 2019/0190679 A1* | 6/2019 | Yerramalli | ............ | H04W 72/21 |
| 2020/0403733 A1* | 12/2020 | He | ......................... | H04L 1/1657 |
| 2022/0183063 A1* | 6/2022 | Talarico | ............ | H04W 74/0808 |

FOREIGN PATENT DOCUMENTS

| | | |
|---|---|---|
| WO | 2016122086 A1 | 8/2016 |
| WO | 2017069798 A1 | 4/2017 |
| WO | 2018152671 A1 | 8/2018 |
| WO | 2020186166 A1 | 9/2020 |

OTHER PUBLICATIONS

International Search Report and Written Opinion in Application No.
PCT/FI2021/050904, mailed Mar. 17, 2022, 12 pages.
ETSI TS 103 636-1 V1.1.1 (Jul. 2020). DECT-2020 New Radio
(NR); Part 1: Overview; Release 1. [online], Jul. 2020, [retrieved on
Sep. 10, 2021]. Retrieved from <https://www.etsi.org/deliver/etsi_
ts/103600_103699/10363601/01.01 .01_60/ts_10363601v010101
p.pdf>.

* cited by examiner

310 — Observing received ACK packets

320 — Determining lengths of ACK gap periods

330 — Adjusting ACK listening duration

340 — Adjusting CCA duration

Step 320

410 — Categorizing determined lengths of the ACK gap periods

340 — Adjusting CCA duration 102
202
204

Antenna part 508

505

Memory part 504

Processing part 502

Data transfer part 506

Power supply part 510

DATA PACKET TRANSACTION TIMING SOLUTION FOR A WIRELESS COMMUNICATION SYSTEM

TECHNICAL FIELD

The invention concerns in general the technical field of wireless communication. Especially the invention concerns wireless communication systems.

BACKGROUND

A wireless communication system, i.e. a wireless communication network, comprises a plurality of radio devices which may communicate with each other. The plurality of radio devices of the wireless communication system may transmit data packets to one or more other radio devices of the wireless communication system to communicate with each other. The transmission of the data packet may be e.g. a unicast transmission, a multicast transmission or a broadcast transmission. In response to receiving a data packet from another radio device (i.e. a transmitting device), a receiving radio device may transmit an acknowledgement (ACK) packet to the transmitting device. The ACK packets are typically used in the unicast communication and usually also in the multicast communication.

Typically, a performance of the wireless communication system may be significantly affected by a length of a packet transaction. The unicast packet transaction (i.e. point-to-point packet transaction or packet transaction between two radio devices) may typically comprise at least the following parts: a Clear Channel Assessment (CCA) duration, an actual data packet transmission from a source device (i.e. the transmitting device) to a target device (i.e. the receiving device), an ACK gap period, and an ACK packet transmission from the target device to the source device. During the CCA duration, the source device evaluates whether a channel to be used for the transmission is free of congestion, i.e. the transmission of the data packet does not interfere other already ongoing transmissions. During the actual data packet transmission, the source device transmits the data packet. During the ACK gap period, the target device handles a reception of the data packet transmitted by the source device and creates the ACK packet. During the ACK packet transmission, the target device transmits the ACK packet to the source device.

Typically, in a single modulation scheme the duration of the maximum length data packet transmission and the duration of the ACK packet transmission are fixed. A CCA duration should cover the ACK gap period so that if another radio device pair within the neighbourhood has already initiated a packet transaction, i.e. already transmitted a data packet, no-one would interrupt their packet transaction by start transmitting during their ACK gap period. The CCA may often be included with some additional random delay to decrease possible collisions between devices that start CCA at the same time.

The length of the ACK gap period (and therefore also the CCA duration) varies within wireless communication systems as different implementations need different amount of time to handle the received data packet and to create the ACK packet. At least one drawback with the varying length of the ACK gap period is that all radio devices within the wireless communication system should use the worst case length of the ACK gap period, i.e. the longest possible length of the ACK gap period occurring in the wireless communication system, to avoid interfering the slowest implementations. This in turn causes suboptimal performance of the wireless communication system.

Thus, there is a need to develop solutions to improve a performance of a wireless communication system.

SUMMARY

The following presents a simplified summary in order to provide basic under-standing of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a wireless communication system, methods, a radio device, a computer program, and a tangible non-volatile computer-readable medium. Another objective of the invention is that the wireless communication system, the methods, the radio device, the computer program, the tangible non-volatile computer-readable medium improve a performance of a wireless communication system.

The objectives of the invention are reached by a wireless communication system, methods, a radio device, a computer program, and a tangible non-volatile computer-readable medium as defined by the respective independent claims.

According to a first aspect, a wireless communication system comprising a plurality of radio devices is provided, wherein each of the plurality of radio devices is capable of transmit and receive data packets, wherein at least one radio device of the plurality of radio devices is configured to: observe acknowledgement (ACK) packets received from one or more neighbouring radio devices belonging to the plurality of radio devices in response to transmitted data packets; determine lengths of ACK gap periods of the one or more neighbouring radio devices based on the observed ACK packets; and adjust its ACK listening duration based on the determined lengths of the ACK gap periods of the one or more neighbouring radio devices.

The at least one radio device may further be configured to adjust its Clear Channel Assessment (CCA) duration based on the determined lengths of the ACK gap periods of the one or more neighbouring radio devices.

Furthermore, the at least one radio device may be configured to: categorize the determined lengths of the ACK gap periods of the one or more neighbouring radio devices into two or more categories, and include, exclude, and/or weight at least one of the two or more categories when adjusting its CCA duration.

Alternatively or in addition, the at least one radio device may be configured to adjust its CCA duration based on ACK gap period information received from a neighbouring radio device, wherein the received ACK gap period information may comprise the length of the ACK gap period of said neighbouring radio device itself, the CCA duration of said neighbouring radio device itself, and/or lengths of the ACK gap periods of one or more neighbouring radio devices of said neighbouring radio device determined based on observed received ACK packets by said neighbouring radio device.

Alternatively or in addition, the at least one radio device may be configured to include its prevailing CCA duration and/or its prevailing length of the ACK gap period as a data field within a beacon packet.

Alternatively or in addition, the at least one radio device may be configured to provide its prevailing CCA duration and/or its prevailing length of the ACK gap period to at least one new radio device associating with the wireless communication system as a part of an association packet exchange.

Each transmitted data packet may comprise a sequence number, which is incremented only when a new data packet is prepared for transmission.

Moreover, at least one radio device of the plurality of radio devices may be configured to adjust the length of its ACK gap period and/or its ACK packet transmission period in response to receiving data packets with the same sequence number.

The at least one radio device may be configured to observe the ACK packets received from the one or more neighbouring radio devices during an observation time window.

Furthermore, the at least one radio device may be configured to adjust a length of the observation time window based on a rate of changes within the wireless communication system.

According to a second aspect, a method for a wireless communication system comprising a plurality of radio devices is provided, wherein each of the plurality of radio devices is capable of transmit and receive data packets, wherein the method comprises: observing, by at least one radio device of the plurality of radio devices, acknowledgement (ACK) packets received from one or more neighbouring radio devices belonging to the plurality of radio devices in response to transmitted data packets; determining, by the at least one radio device of the plurality of radio devices, lengths of ACK gap periods of the one or more neighbouring radio devices based on the observed ACK packets; and adjusting, by the at least one radio device of the plurality of radio devices, its ACK listening duration based on the determined lengths of the ACK gap periods of the one or more neighbouring radio devices.

According to a third aspect, a radio device for a wireless communication system is provided, wherein the radio device is configured to: observe acknowledgement (ACK) packets received from one or more neighbouring radio devices in response to transmitted data packets; determine lengths of ACK gap periods of the one or more neighbouring radio devices based on the observed ACK packets; and adjust its ACK listening duration based on the determined lengths of the ACK gap periods of the one or more neighbouring radio devices.

According to a fourth aspect, a method for the radio device described above within a wireless communication system is provided, wherein the method comprises: observing, by the radio device, acknowledgement (ACK) packets received from one or more neighbouring radio devices in response to transmitted data packets; determining, by the radio device, lengths of ACK gap periods of the one or more neighbouring radio devices based on the observed ACK packets; and adjusting, by the radio device, its ACK listening duration based on the determined lengths of the ACK gap periods of the one or more neighbouring radio devices.

According to a fifth aspect, a computer program is provided, wherein the computer program comprises instructions which, when the program is executed by the radio device described above, cause the radio device to carry out at least the steps of the method described above.

According to a sixth aspect, a tangible non-volatile computer-readable medium comprising the computer program described above is provided.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
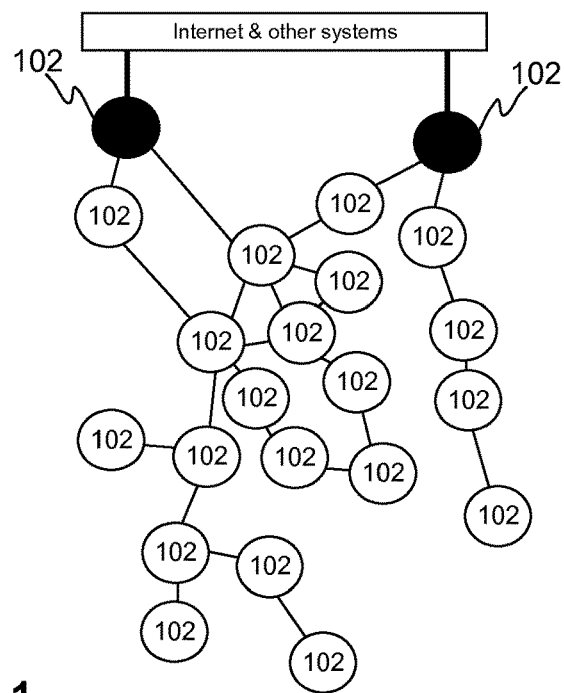
FIG. 1 illustrates schematically an example of a wireless communication system according to the invention.

FIG. 1 illustrates schematically an example of a wireless communication system, i.e. a wireless communication network, 100 according to the invention. The example wireless communication system 100 of FIG. 1 is implemented in a mesh topology. However, the invention is not limited to the mesh topology and the wireless communication system 100 may also be implemented in any other network topologies, e.g. a star topology, a ring topology, a hybrid topology, or any other network topologies. Some non-limiting examples of wireless communication technologies to which the wireless communication system 100 may be applied may comprise, but is not limited to, Bluetooth Low Energy (BLE) mesh network, Public Land Mobile Network (PLMN), Wireless Local Area network (WLAN), cellular network, or wireless mesh network, e.g. wireless sensor network, and/or any other wireless networks.

The wireless communication system 100 comprises a plurality of radio devices 102, e.g. radio nodes. Each of the plurality of radio devices 102 of the wireless communication system 100 is capable of transmit and receive one or more data packets 220. The term "data packet" means throughout this application any radio transmission carrying information needed by the wireless communication system 100 itself and/or higher layer applications using the wireless communication system 100. The data packets 220 may be transmitted to and/or received from one or more other radio devices 102 of the wireless communication system 100 to communicate with the one or more other radio devices 102. The transmission of the data packets 220 may comprise unicast transmission of the data packets 220 and/or multicast transmission of the data packets 220. The unicast transmissions may be used in point-to-point communication, i.e.

communication between two radio devices. The multicast transmissions may be used in multicast communication, i.e. communication between one transmitting radio device and a limited number of receiving radio devices. The wireless communication system 100 may comprise at least one sink device that may be part of gateways to other networks, e.g. Internet, and deliver data to and from the wireless communication system 100. In the example of FIG. 1 the two radio devices 102 illustrated with solid black circles are operating as the sink devices.

In response to receiving a data packet 220 from another radio device, i.e. a transmitting device 202, a receiving radio device 204 may transmit an acknowledgement (ACK) packet 240 to the transmitting radio device 202 to indicate whether the reception of the data packet 220 was correct or not. The term "ACK packet" means throughout this application any radio transmission that carries information as a feedback for receiving or not receiving the data packet 220. The receiving radio device 202 performs an error detection calculation process to ensure, i.e. check, whether the reception of the data packet 220 was correct or not, and transmits the ACK packet 240 that indicates the result of the error detection calculation process. The error detection calculation process may be e.g. a Cyclic Redundancy Check (CRC) process or any other suitable error detection process. The ACK packet 240 may be a positive ACK packet, i.e. indicate a correct reception of the data packet 220, or a negative ACK packet, i.e. indicate an incorrect reception of the data packet 220, depending on the result of the error detection calculation. The terms "acknowledgement packet" and "ACK packet" used throughout this application mean any kind acknowledgement packet, either positive or negative. In some cases, the negative ACK packets 240 are not transmitted. Thus, if the transmitting radio device 202 does not receive the ACK packet 240 from the receiving device 204 in response to the transmitted data packet 220, it may be an indication of an incorrect reception of the data packet 220 or an indication that the receiving radio device 204 did not receive the data packet 220 at all. Alternatively or in addition, in some cases, instead of transmitting the ACK packet 240 separately in response to receiving each data packet 220, the receiving radio device 202 may transmit one common ACK packet 240 to the transmitting radio device 202 in response to receiving two or more data packets 220 from the same transmitting device 202. Alternatively or in addition, in some cases, if the transmitting radio device 202 does not receive the ACK packet 240 from the receiving radio device 204 and/or the received ACK packet 240 is negative, the transmitting radio device 202 may retransmit the data packet 220 to the receiving radio device 204 until a positive ACK packet 240 is received or until a predefined limit amount of retransmissions of the same data packet 220 is met. The transmission of the data packet 220 and the ACK packet 240 are discussed more next referring to FIGS. 2A and 2B that illustrate timing examples of a data packet transaction with an ACK packet 240.

Figure 2A:
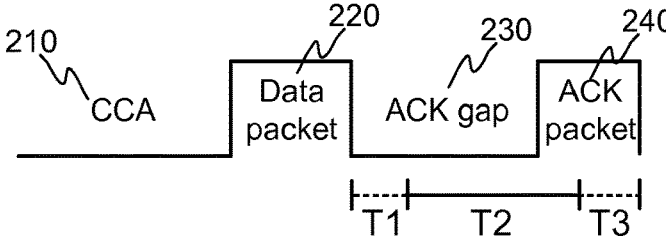
FIGS. 2A and 2B illustrate timing examples of a data packet transaction with an acknowledgement between two radio devices.

FIG. 2A illustrates a simple timing example of the data packet transaction with the ACK packet 240 between two radio devices 102. The two radio devices 102 may comprise a first radio device, i.e. a transmitting radio device or a source device, 202 and a second radio device, i.e. a receiving radio device or a target radio device, 204. FIG. 2A illustrates main phases of the data packet transaction with the ACK packet. The main phases of the data packet transaction with the ACK packet may comprise at least the following phases: a Clear Channel Assessment (CCA) duration 210, a data packet 220 transmission period, an ACK gap period 230, and an ACK packet 240 transmission period. The example of FIG. 2A introduces the main phases of the data packet transaction between two radio devices 102 without specifying operations of the two devices during the data packet transaction.

During the CCA duration 210, the first radio device 202 performs a CCA process, in which the first radio device 202 evaluates whether a channel to be used for the transmission of the data packet 220 is free of congestion, i.e. the transmission of the data packet 220 does not interfere other already ongoing transmissions. During the data packet 220 transmission period, the data packet 220 is transmitted from the first radio device 202 to the second radio device 204. During the ACK gap period 230, the second radio device 204 processes a reception of the data packet 220 transmitted by the first radio device 202 and creates the ACK packet 240, e.g. according to the result of the error detection calculation as discussed above. During the ACK packet 240 transmission period, the ACK packet 240 is transmitted from the second radio device 204 to the first radio device 202. In the example of FIG. 2A T1 represents a time period that the first radio device 202 needs for preparing before it is ready to receive the ACK packet 240, i.e. the first radio device 202 switches from a transmitting mode Tx to a receiving mode Rx. In the example of FIG. 2A T2 represents a time period that the first radio device 202 maintains its receiving mode Rx on while waiting for the ACK packet 240 transmission from the second radio device 204 to start. In the example of FIG. 2A T3 represents an additional time period for receiving the whole ACK packet 240, if the transmission of the ACK packet 240 is started during the T2 but is not completed during the T2.

Figure 2B:
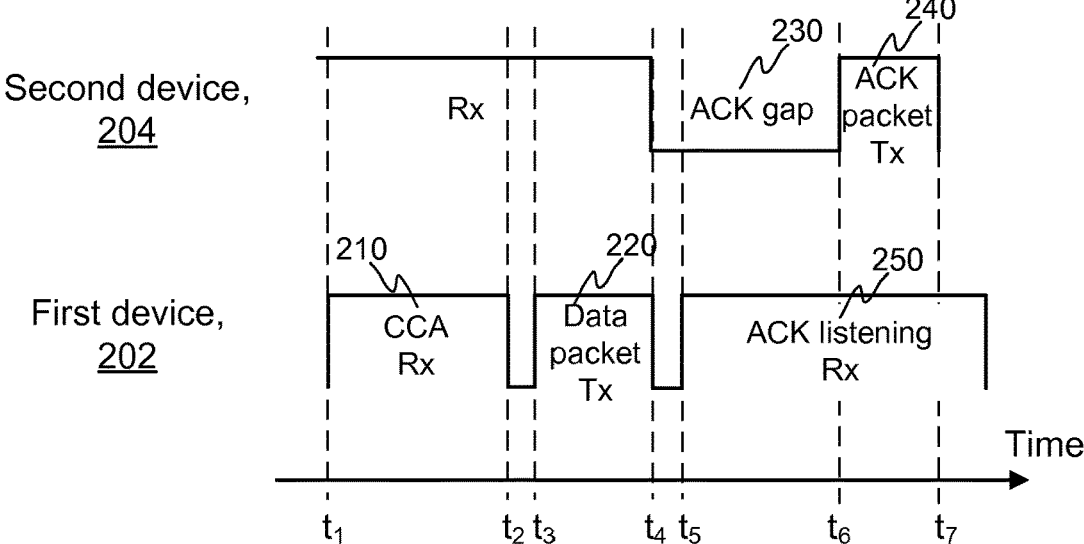

FIG. 2B illustrates another non-limiting timing example of the data packet transaction with the ACK packet between two radio devices 102. The two radio devices 102 may comprise a first radio device, i.e. a transmitting radio device or a source radio device, 202 and a second radio device, i.e. a receiving radio device or a target radio device, 204, similarly as in the example of FIG. 2A. The example of FIG. 2B illustrates a more detailed timing example of the data packet 220 transaction with the ACK packet 240 between two radio devices 102, wherein activities, i.e. operations, of the first radio device 202 and the second radio device 204 are separated, i.e. the data packet transaction is illustrated separately from the perspective of the first radio device 202 and from the perspective of the second radio device 204. The upper diagram, i.e. the upper graph, of FIG. 2B illustrates the activities of the second radio device 204 during the data packet transaction and the lower diagram, i.e. the lower graph, of FIG. 2B illustrates the activities of the first radio device 204 during the data packet transaction. Rx means a receiving mode of a device and Tx means a transmitting mode of a device in the example of FIG. 2B.

At a time instant $t_1$ the CCA duration 210 starts, during which the first radio device 202 performs the CCA process. At a time instant $t_2$ the first radio device 202 ends the CCA process. A time period between the time instant $t_1$ and the time instant $t_2$ represents the CCA duration 210 of the first radio device 202, i.e. a duration of the CCA process of the first radio device 202. During a time period between the time instant $t_2$ and a time instant $t_3$ the first radio device 202 switches from the receiving mode Rx to the transmitting mode Tx. At the time instant $t_3$ the first radio device 202 starts the transmission of the data packet 220 and the transmission of the data packet 220 ends at a time instant $t_4$. A time period between the time instant $t_3$ and the time instant $t_4$ represents the data packet 220 transmission period of the first radio device 202. A time period between the time instant $t_4$ and a time instant $t_5$ corresponds to the time period T1 discussed above referring to the example of FIG. 2A. In other words, during the time period between the time instant $t_4$ and the time instant $t_5$ the first radio device 202 prepares to be ready to receive the ACK packet, i.e. the first radio device 202 switches from the transmitting mode Tx to the receiving mode Rx. At the time instant $t_5$ the first radio device 202 starts an ACK listening phase. During the ACK listening phase, the first radio device 202 waits to receive the ACK packet 240 transmission from the second radio device 204. An ACK listening duration 250 represents the duration of the ACK listening phase, i.e. a time period during which the first radio device 202 waits to receive the ACK packet 240 transmission from the second radio device 204. At a time instant to the first radio device 202 starts a reception of the ACK packet 240 from the second device 204 and the reception of the ACK packet 240 ends at a time instant $t_7$. The first radio device 202 waits for the whole ACK listening duration 250 before making the decision that there is no response, i.e. the ACK packet 240, coming. The ACK listening duration 250 corresponds to the time period T2 discussed above referring to the example of FIG. 2A. The first radio device 202 may extend the ACK listening duration 250 until the end of the ACK packet 240 transmission to reduce retransmissions of the data packet, if the ACK packet 240 transmission by the second radio device 204 starts close to the end of the ACK listening duration 250 of the first radio device 202. The possible extended duration of the ACK listening duration 250 corresponds to the represents the additional time period T3 discussed above referring to the example of FIG. 2A. In the Example of FIG. 2B the reception of the ACK packet 240 ends during the ACK listening duration 250, thus in the example of FIG. 2B, the additional time period T3 is not needed.

At a starting point of the data packet transaction, the second radio device 204 is in the receiving mode Rx waiting to receive one or more data packets 220 from the first radio device 202. At the time instant $t_3$ the second radio device 204 starts a reception of the data packet 220 from the first device 202 and the reception of the data packet 220 ends at the time instant $t_4$. At the time instant $t_4$ the second radio device 204 starts the ACK gap period 230 phase. During the ACK gap period 230 phase the second radio device 204 processes the reception of the data packet 220 transmitted by the first radio device 202 and creates the ACK packet 240, e.g. according to the result of the error detection calculation as discussed above. A length of the ACK gap period 230 represents the duration of the ACK gap period 230 phase. The second radio device 202 switches from the receiving mode Rx to the transmitting mode Tx during ACK gap period 230. At the time instant to the second radio device 204 starts the transmission of the ACK packet 240 and the transmission of the ACK packet 240 ends at a time instant $t_7$. The time period between the time instant $t_6$ and the time instant $t_7$ represents the ACK packet 240 transmission period of the second radio device 204.

Figure 3:
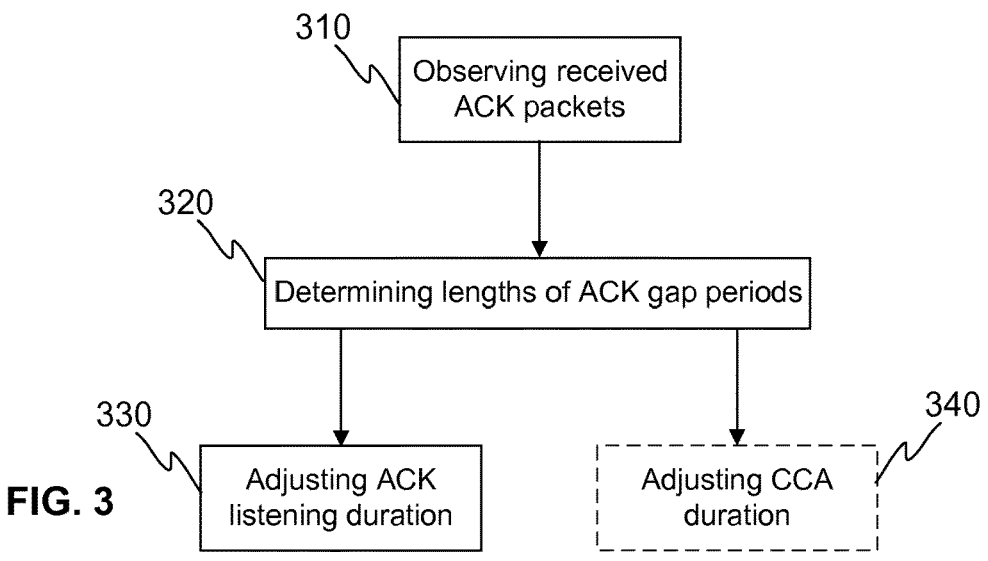
FIG. 3 illustrates schematically an example of a method according to the invention.

A timing method according to the invention may be used in the previously discussed wireless communication system 100. An example of the timing method according to the invention is described next referring to FIG. 3, which schematically illustrates an example of the invention as a flow chart. The method is explained mainly by referring to one radio device 102, i.e. the first radio device 202, which belongs to the wireless communication system 100. However, each radio device 102, 202, 204 of the wireless communication system 100 is able to perform the method steps. Each radio device 102, 202, 204 of the wireless communication system 100 is able to transmit at least one data packet 220 to one or more other radio devices, i.e. one or more neighbouring radio devices, 102, 202, 204 and to receive at least one data packet 220 from the one or more other devices 102, 202, 204 as previously has been discussed. In other words, each radio device 102, 202, 204 of the wireless communication system 100 is able to provide, by means of its data transfer part 506, a bi-directional radio communication with one or more other radio devices, i.e. one or more neighbouring radio devices, 102, 202, 204 in the wireless communication system 100. In other words, each radio device 102, 202, 204 of the wireless communication system 100 may act as the first radio device 202 and/or as the second radio device 204.

The term "neighbouring radio device" means throughout this application a radio device whose radio transmissions may be detected by a receiving radio device. An extended meaning of the term "neighbouring radio device" takes into account the neighbour(s) of the neighbour(s) of the radio device, i.e. multi-hop neighbour(s), such as two-hop neighbour(s), three-hop neighbour(s), four-hop neighbour(s), and/or so on. The term "neighbourhood of a radio device" mean throughout this application one or more radio devices whose radio transmissions may be detected by a receiving radio device. An extended meaning of the term "neighbourhood of a radio device" takes into account the neighbour(s) of the neighbour(s) of the radio device, i.e. multi-hop neighbourhood, such as two-hop neighbourhood, three-hop neighbourhood, four-hop neighbourhood, and/or so on.

At a step 310 the first radio device 202 observes ACK packets 240 received from one or more neighbouring radio devices 102, 204 belonging to the plurality of radio devices of the wireless communication system 100. The ACK packets 240 are received by the first radio device 202 in response to transmitted data packets 220. In other words, the first radio device 202 transmits one or more data packets 220 to the one or more neighbouring radio devices 102, 204 and observes the respective one or more received ACK packets 240 from the one or more neighbouring radio devices 102, 204.

The first radio device 202 may observe the ACK packets 240 received from the one or more neighbouring radio devices 102, 204 during an observation time window. The first radio device 202 may adjust a length of the observation time window based on a rate of changes within the wireless communication system 100. In other words, the first radio device 202 may adjust the length of the observation time window based on how fast changes may happen within the wireless communication system 100. For example, if one or more of the plurality of radio devices 102 starts to move more or faster than previously, the first radio device 202 may shorten the length of the observation time window in order to take into account only the latest observed ACK packets 240.

At a step 320, the first radio device 202 determines lengths of the ACK gap periods 230 of the one or more neighbouring radio devices 102, 204 based on the observed ACK packets 240. The determination of the length of the ACK gap period 230 of each of the one or more neighbouring radio device 102, 204 may comprise e.g. measuring a time elapsed from the end of the data packet 220 transmission to the start of the respective ACK packet 240 reception.

At a step 330, the first radio device 202 adjusts its ACK listening duration 250 based on the determined lengths of the ACK gap periods 230 of the one or more neighbouring radio devices. This improves the performance of the wireless communication system 100 and reduces power consumption. The adjusting of the ACK listening duration 250 of the first radio device 202 may comprise determining e.g. a maximum length of the ACK gap period 230 based on the determined lengths of the ACK gap periods 230 of the one or more neighbouring radio devices and adjusting the ACK listening duration 250 of the first radio device 202 according to the determined maximum length of the ACK gap period 230. The adjusting may comprise increasing or decreasing the ACK listening duration 250 of the first radio device 202. For example, if the determined maximum length of the ACK gap period 230 is substantially short, the ACK listening duration 250 of the first radio device 202 may be decreased, which improves the performance of the wireless communication system 100 and reduces the power consumption of the first radio device 202. Alternatively, if the determined maximum length of the ACK gap period 230 is substantially long, the ACK listening duration 250 of the first radio device 202 may be increased.

At an optional step 340, the first radio device 202 may further adjust its CCA duration 210. This improves the performance of the wireless communication system 100. The CCA duration 210 of the first radio device 202 needs to cover the lengths of the ACK gap periods 230 of the one or more neighbouring radio devices 102, 202 so that if at least one other radio device pair within the neighbourhood has already initiated a data packet transaction, i.e. already transmitted a data packet, the first device 202 does not interrupt the packet transaction of the at least one other radio device pair by starting transmitting the data packet 220 during the ACK gap period 230 of the at least one other radio device pair. The at least one other radio device pair may be e.g. at least one second transmitting radio device and at least one second receiving radio device belonging to the one or more neighbouring radio devices of the first radio device 204. The adjusting may comprise increasing or decreasing the CCA duration 210 of the first radio device 202.

According to an example of the invention, at the step 340 the first radio device 202 may adjust its CCA duration 210 based on the determined lengths of the ACK gap periods 230 of the one or more neighbouring radio devices. The adjusting of the CCA duration 210 of the first radio device 202 may comprise determining e.g. a maximum length of the ACK gap period 230 based on the determined lengths of the ACK gap periods 230 of the one or more neighbouring radio devices and adjusting the CCA duration 210 of the first radio device 202 according to the determined maximum length of the ACK gap period 230. For example, if the maximum length of the ACK gap period 230 is substantially short, the CCA duration 210 of the first radio device 202 may be decreased, which improves the performance of the wireless communication system 100. Alternatively, if the determined maximum length of the ACK gap period 230 is substantially long, the CCA duration 210 of the first radio device 202 may be increased. In addition, the CCA duration may be added with a random delay e.g. in wireless communication systems where simultaneous start times of CCA are likely.

Alternatively or in addition, at the step 340 the first radio device 202 may adjust its CCA 210 duration based on ACK gap period 230 information received from a neighbouring radio device, i.e. a reporting radio device. The received ACK gap period 230 information may comprise e.g. the length of the ACK gap period 230 of the reporting radio device itself, the CCA duration 210 of the reporting radio device itself, and/or lengths of the ACK gap periods 230 of one or more neighbouring radio devices of the reporting radio device determined based on observed received ACK packets 240 by the reporting radio device.

Figure 4:
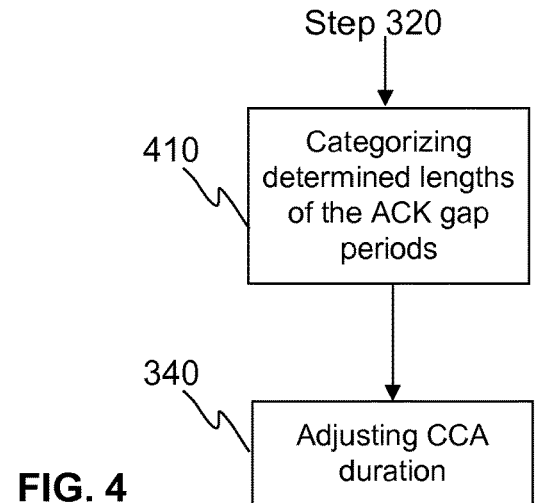
FIG. 4 illustrates schematically another example of a method according to the invention.

According to an example of the invention, the first radio device 202 may further categorize 410 the determined lengths of the ACK gap periods 230 of the one or more neighbouring radio devices 102, 204 into two or more categories. The determined lengths of the ACK gap periods 230 of the one or more neighbouring radio devices 102, 204 may be categorized e.g. based on delays in the ACK packet 240 transmissions and/or a nature of the determined lengths of the ACK gap periods 230 of the one or more neighbouring radio devices 102, 204, e.g. the nature may be deterministic etc. For example, there may be occasionally longer delays transmitting the ACK packet 240, e.g. if the second radio device 204 prioritizes a transmission or a reception of one or more beacon messages over the ACK packet 240 transmission. The first radio device 202 may further include, exclude, and/or weight at least one of the two or more categories when adjusting its CCA duration 210 at the step 340. This enables taking into account in the adjusting of the CCA duration 210 only the most relevant determined lengths of the ACK gap periods 230 of the one or more neighbouring radio devices 102, 204. FIG. 4 illustrates schematically an example of the method according to the invention comprising the optional categorizing step 410 of the determined lengths of the ACK gap periods 230 of the one or more neighbouring radio devices 102, 204 into the two or more categories. Moreover, in the example of FIG. 4, the first radio device 202 includes, excludes, and/or weights at least one of the two or more categories when adjusting its CCA duration 210 at the step 340.

According to an example of the invention, the first radio device 202 may include its prevailing CCA duration 210, i.e. the CCA duration 210 which the first radio device 202 is currently using, and/or its prevailing length of the ACK gap period 230, i.e. the length of the ACK gap period 230 which the first radio device 202 is currently using, as a data field within a beacon packet. The first radio device 202 may broadcast the beacon packet to one or more neighbouring radio devices 102, 202, 204 belonging to the wireless communication system 100. This may allow the one or more neighbouring radio devices 102, 202 to adjust their CCA duration 210 and/or ACK listening duration 250 with less own observation and/or more quickly. The one or more neighbouring radio devices 102, 202, 204 may adjust their CCA duration 210 and/or their ACK listening duration 250 in response to receiving the beacon message from the first radio device 202. In other words, the one or more neighbouring radio devices 102, 202, 204 may adjust their CCA duration 210 and/or their ACK listening duration 250 based on the CCA duration 210 and/or the length of the ACK gap period 230 included in the beacon packet broadcasted by the first radio device 202.

Alternatively or in addition, the first radio device 202 may provide its prevailing CCA duration 210 and/or its prevailing length of the ACK gap period 230 to at least one new radio device associating with the wireless communication system 100 as a part of an association packet exchange, when the at least one new radio device is associating with, i.e. joining to, the wireless communication system 100. This may allow the at least one new radio device to adjust their CCA duration 210 and/or ACK listening duration 250 with less own observation and/or more quickly. For example, the first radio device 202 may include its prevailing CCA duration 210 and/or its prevailing length of the ACK gap period 230 in an association packet, e.g. an association message. The first radio device 202 may provide, e.g. transmit, the association packet to the at least one new radio device associating with the wireless communication system 100 as a part of the association packet exchange, when the at least one new radio device is associating with the wireless communication system 100. The at least one new radio device associating with the wireless communication system 100 may adjust their CCA duration 210 and/or their ACK listening duration 250 in response to the association packet exchange with the first radio device 202, e.g. in response to receiving the association packet from the first radio device 202. In other words, the at least one new radio device associating with the wireless communication system 100 may adjust their CCA duration 210 and/or their ACK listening duration 250 based on the CCA duration 210 and/or the length of the ACK gap period 230 provided by the first radio device 202.

According to an example of the invention, each transmitted data packet 220 may comprise a sequence number, which is incremented only when a new data packet 220 is prepared for transmission. In other words, the sequence number is maintained the same for retransmissions of the data packets 220 and incremented for the transmission the new data packet 220. Each radio device 102, 202, 204 of the wireless communication system 100 may further adjust the length of its ACK gap period 230 and/or its ACK packet 240 transmission period in response to receiving data 220 packets with the same sequence number. According to a non-limiting example, each radio device 102, 202, 204 may adjust the length of its ACK gap period 230 and/or its ACK packet 240 transmission period in response to receiving a predefined number of data packets 220 with the same sequence number. The use of the sequence number may enable detecting possible timing mismatches with the plurality of radio devices 102. It may allow identifying too fast or too slow ACK packets 240 e.g. by detecting persistent retransmission of the data packet 220 with the same sequence number. For example, if the first radio device 202 switches its receiving mode Rx on after the second radio device 204 has already started to transmit the respective ACK packet 240, the first device 202 misses the reception of the ACK packet 240.

Figure 5:
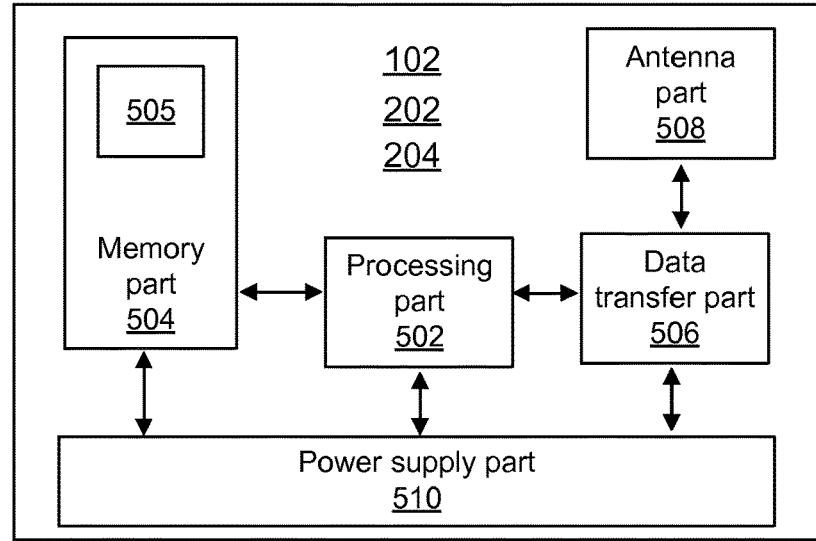
FIG. 5 illustrates an example of a radio device according to the invention.

FIG. 5 illustrates an example of a radio device (apparatus) 102, 202, 204 according to the invention. The radio device 102, 202, 204 comprises a processing part 502 that is configured to perform user and/or computer program (software) initiated instructions, and to process data in order to run an application and communication protocol. The processing part 502 may comprise at least one processor, e.g. one, two, or three processors. The radio device 102, 202, 204 further comprises a memory part 504 in order to store and to maintain data. The data may be instructions, computer programs, and data files. The memory part 504 may comprise at least one memory, e.g. one, two, or three memories.

The radio device 102, 202, 204 further comprises a data transfer part 506 and an antenna part 508 for providing a bi-directional radio communication with at least one other radio device 102, 202, 204. The radio device 102, 202, 204 may use the data transfer part 506 in order to transmit data packets 220, ACK packets 240, commands, requests, messages, and data to at least one of other radio devices 102, 202, 204 of the wireless communication system 100 via the antenna part 508. The data transfer part 506 also receives data packets 220, ACK packets 240, commands, requests, messages, and data from at least one of the other radio devices 102, 202, 204 via the antenna part 508 in the wireless communication system 100. The radio device 102, 202, 204 may further comprise a power supply part 510. The power supply part 510 comprises components for powering the radio 102, 202, 204, e.g. a battery and a regulator.

The memory part 502 comprises a data transfer application for operating, i.e. controlling, the data transfer part 506, an antenna application for operating the antenna part 508, and a power supply application for operating the power supply part 510.

The memory part 504 comprises also a timing application, i.e. a computer program, 505 comprising instructions which, is configured to use at least one of parts 506, 508, 510 in order to perform, i.e. carry out, at least the operations, i.e. the method steps, of the radio device 102, 202, 204 described above in this description part and figures, when it is run, i.e. executed, by a computer, e.g. by the radio device 102, 202, 204 by means of the processing part 502.

The computer program 505 may be stored in a non-statutory tangible computer readable medium, e.g. an USB stick or a CD-ROM disc.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A wireless communication system comprising a plurality of radio devices, each of the plurality of radio devices is capable of transmit and receive data packets, wherein at least one radio device of the plurality of radio devices is configured to:

transmit data packets receive acknowledgement (ACK) packets from one or more neighboring radio devices belonging to the plurality of radio devices in response to the transmitted data packets, determine lengths of ACK gap periods of the one or more neighboring radio devices based on the ACK packets, wherein each of the lengths of the ACK gap periods represents a time period during which said one or more neighboring radio devices processes reception of the data packets transmitted by said radio device and creates the ACK packets, and adjust its ACK listening duration based on the determined lengths of the ACK gap periods of the one or more neighboring radio devices, wherein the ACK listening duration represents a time period during which said radio device waits to receive the ACK packets from said one or more neighboring radio devices.

2. The wireless communication system according to claim 1, wherein the at least one radio device is further configured to adjust its Clear Channel Assessment (CCA) duration based on the determined lengths of the ACK gap periods of the one or more neighboring radio devices.

3. The wireless communication system according to claim 2, wherein the at least one radio device is configured to:

categorize the determined lengths of the ACK gap periods of the one or more neighboring radio devices into two or more categories, and include, exclude, and/or weight at least one of the two or more categories when adjusting its CCA duration.

4. The wireless communication system according to claim 1, wherein the at least one radio device is configured to adjust its CCA duration based on ACK gap period information received from a neighboring radio device, wherein the received ACK gap period information comprises the length of the ACK gap period of said neighboring radio device itself, the CCA duration of said neighboring radio device itself, and/or lengths of the ACK gap periods of one or more neighboring radio devices of said neighboring radio device determined based on observed received ACK packets by said neighboring radio device.

5. The wireless communication system according to claim 1, wherein the at least one radio device is configured to include its prevailing CCA duration and/or its prevailing length of the ACK gap period as a data field within a beacon packet.

6. The wireless communication system according to claim 1, wherein the at least one radio device is configured to provide its prevailing CCA duration and/or its prevailing length of the ACK gap period to at least one new radio device associating with the wireless communication system as a part of an association packet exchange.

7. The wireless communication system according to claim 1, wherein each transmitted data packet comprises a sequence number, which is incremented only when a new data packet is prepared for transmission.

8. The wireless communication system according to claim 7, wherein at least one radio device of the plurality of radio devices is configured to adjust the length of its ACK gap period and/or its ACK packet transmission period in response to receiving data packets with the same sequence number.

9. The wireless communication system according to claim 1, wherein the at least one radio device is configured to receive the ACK packets from the one or more neighboring radio devices during an observation time window.

10. The wireless communication system according to claim 9, wherein the at least one radio device is configured to adjust a length of the observation time window based on a rate of changes within the wireless communication system.

11. A method for a wireless communication system comprising a plurality of radio devices, each of the plurality of radio devices is capable of transmit and receive data packets, wherein the method comprises:
transmitting data packets
receiving, by at least one radio device of the plurality of radio devices, acknowledgement (ACK) packets from one or more neighboring radio devices belonging to the plurality of radio devices in response to the transmitted data packets,
determining, by the at least one radio device of the plurality of radio devices, lengths of ACK gap periods of the one or more neighboring radio devices based on the ACK packets, wherein each of the lengths of the ACK gap periods represents a time period during which said one or more neighboring radio devices processes reception of the data packets transmitted by said radio device and creates the ACK packets, and
adjusting, by the at least one radio device of the plurality of radio devices, its ACK listening duration based on the determined lengths of the ACK gap periods of the one or more neighboring radio devices, wherein the ACK listening duration represents a time period during which said radio device waits to receive the ACK packets from said one or more neighboring radio devices.

12. A radio device for a wireless communication system, wherein the radio device comprises:
a processor, and
a transceiver for providing a bi-directional radio communication with at least one other radio device,
wherein the radio device is configured to:
transmit data packets
receive, by the transceiver, acknowledgement (ACK) packets from one or more neighboring radio devices in response to the transmitted data packets,
determine, by the processor, lengths of ACK gap periods of the one or more neighboring radio devices based on the ACK packets, wherein each of the lengths of the ACK gap periods represents a time period during which said one or more neighboring radio devices processes reception of the data packets transmitted by said radio device and creates the ACK packets, and
adjust, by the processor, its ACK listening duration based on the determined lengths of the ACK gap periods of the one or more neighboring radio devices, wherein the ACK listening duration represents a time period during which said radio device waits to receive the ACK packets from said one or more neighboring radio devices.

13. A method for a radio device within a wireless communication system, the method comprises:
transmitting data packets
receiving, by the radio device, acknowledgement (ACK) packets from one or more neighboring radio devices in response to the transmitted data packets,
determining, by the radio device, lengths of ACK gap periods of the one or more neighboring radio devices based on the ACK packets, wherein each of the lengths of the ACK gap periods represents a time period during which said one or more neighboring radio devices processes reception of the data packets transmitted by said radio device and creates the ACK packets, and
adjusting, by the radio device, its ACK listening duration based on the determined lengths of the ACK gap periods of the one or more neighboring radio devices, wherein the ACK listening duration represents a time period during which said radio device waits to receive the ACK packets from said one or more neighboring radio devices.

14. A non-transitory computer-readable medium comprising a computer program that comprises instructions which, when the program is executed by a computer, cause the computer to carry out at least the steps of the method according to claim 13.

* * * * *